July 13, 1937.  H. W. DOENNECKE ET AL  2,086,902
METHOD OF RECOVERING ANHYDROUS SODIUM SULPHATE
Filed Aug. 31, 1935
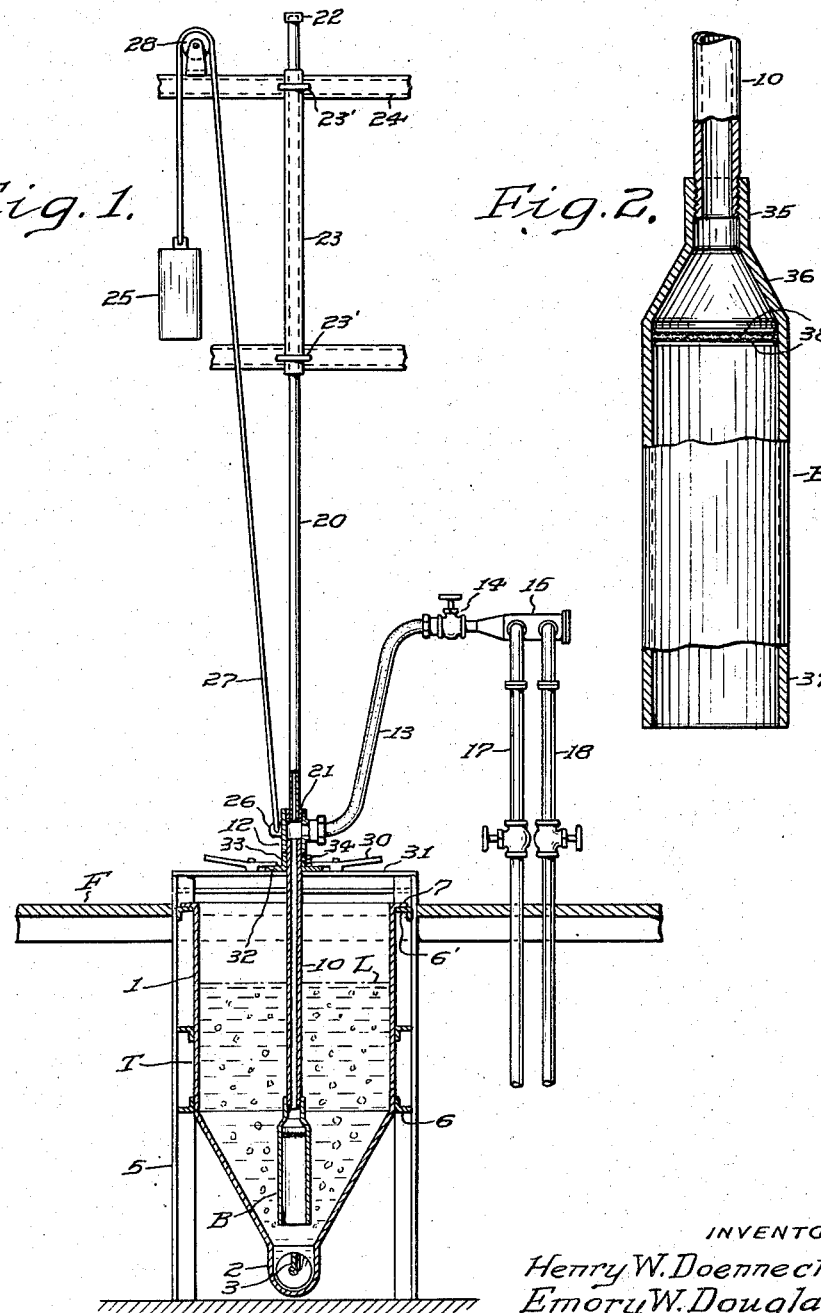
INVENTORS
Henry W. Doennecke,
Emory W. Douglass,
Carl O. Anderson.
BY George K. Holbert Jr.
ATTORNEY
WITNESS
F. J. Hartman.

Patented July 13, 1937

2,086,902

UNITED STATES PATENT OFFICE 2,086,902

METHOD OF RECOVERING ANHYDROUS SODIUM SULPHATE

Henry W. Doennecke and Emory W. Douglass, Tulsa, Okla., and Carl O. Anderson, Baxter Springs, Kans., assignors to Ozark Chemical Company, Tulsa, Okla., a corporation of Delaware Application August 31, 1935, Serial No. 38,714

3 Claims. (Cl. 23—121)

Anhydrous sodium sulphate shall be considered as including any physical form of the solid salt, sodium sulphate, which does not contain any combined water of crystallization. It shall also be understood that this salt may be of any degree of purity insofar as the sodium sulphate content is concerned.

The present invention relates to the recovery of anhydrous sodium sulphate from solutions thereof and particularly to the commercial recovery of anhydrous sodium sulphate from water solutions containing only sodium sulphate or containing sodium sulphate and other constituents or from "slurry" consisting of a fluid mass having crystals and/or particles of the hydrous Glauber's salt $Na_2SO_4.10H_2O$ and of the anhydrous sodium sulphate in suspension therein.

The recovery of anhydrous sodium sulphate from natural brine or other sodium sulphate bearing fluids by direct processes of various types has heretofore been suggested but as far as we are aware none of these is commercially practicable for the reasons, among others, that even when relatively concentrated solutions of the salt are available, the tendency of such solutions to precipitate out anhydrous sodium sulphate as a scale on the walls and other parts of any apparatus in which they are heated inhibits satisfactory recovery of the anhydrous salt on a commercial basis. Moreover, the scale, consisting of anhydrous salt, adheres tenaciously to the walls of the concentrating apparatus through which heat exchange is effected and in such quantities as to rapidly impair the efficiency of the apparatus and substantially prevent its continuous operation by necessitating frequent shutdowns for the removal of the adhering caked salt therefrom.

The present invention is therefore particularly useful in the commercial recovery of anhydrous sodium sulphate by removal of water from a fluid or semi-fluid mass comprising water containing sodium sulphate in relatively high concentration and thus either wholly or only partially dissolved therein. We may therefore utilize as materials from which the anhydrous salt is to be extracted either crystals of the hydrous salt, which melt at a relatively low temperature with a portion of the contained sodium sulphate dissolving in the released water of crystallization, or slurry containing such crystals or crystals of anhydrous sodium sulphate in suspension in a saturated solution of the salt, or solutions, saturated or unsaturated, wherein the quantity relationships of the contained constituents are such as to permit precipitation of sodium sulphate by evaporation alone. These materials are obtainable readily from certain natural brines or other sources; for example, the hydrous salt $Na_2SO_4.10H_2O$ may be recovered with the aid of the method for the recovery of crystalline Glauber's salt disclosed in Patent 2,007,956, issued July 16, 1935, to Sidney H. Davis, Carl O. Anderson, and Rudolph Stengl.

A principal object of our invention, therefore, is the provision of a commercially useful method of treating relatively concentrated sodium sulphate bearing fluids or semi-fluids to extract anhydrous sodium sulphate therefrom.

Another object of the invention is the provision of a continuous method for dehydrating hydrous sodium sulphate in large quantities with the aid of submerged combustion heating at a cost rendering the method adapted for commercial purposes.

Other objects, purposes and advantages of the invention will hereinafter more fully appear or will be understood from the following description of the method thereof as performed with the aid of apparatus constructed in accordance therewith of which a preferred embodiment is shown in the accompanying drawing, which forms the subject of a divisional application Serial No. 141,340 filed by us on or about May 7, 1937 entitled Apparatus for recovering anhydrous sodium sulphate and the like.

In said drawing, Fig. 1 is a somewhat diagrammatic side elevation of said apparatus partially in vertical section, and Fig. 2 is an enlarged detail of an improved burner constructed in accordance with the invention and adapted for use in the performance of the method thereof.

The same characters are used to designate the same parts in both figures.

We shall first refer to the apparatus, which may comprise a tank T desirably made of Monel metal or other relatively non-corrosive substance and preferably provided with a smooth interior finish; its side walls 1 preferably converge near the bottom into an elongated relatively narrow U-shaped trough 2 within which is disposed a screw conveyor 3 of a usual type operated by any convenient means (not shown) and adapted for conveying to a suitable point in the trough for removal the solids precipitated from the solution. These precipitated solids, gathered together at such point by the conveyor, are in the form of relatively small particles and may thus be removed in any convenient way; as such removal can readily be effected with the aid of any suitable apparatus no specific description or illustration thereof is required.

The tank is conveniently supported to extend below the floor level F from suitable legs 5 of a frame comprising also horizontal retaining bars 6, and the upper edges of the tank are outwardly flanged at 7 to rest upon the uppermost set 6' of these bars.

The tank may be of any desired form, preferably an elongated oval in horizontal section, and of any convenient length; for example its length, measured parallel to the conveyor axis, may be about twice its width, measured transversely thereof, and in a tank about 10 feet long and 5 feet wide we provide a pair of spaced identical burners and associated mechanisms for direct heating of the fluid therein, but three such burners may be employed if desired, and in a tank of considerably greater length in proportion to its width we may utilize an even larger number in order to afford larger capacity. The construction and use of such apparatus, including an elongated tank and several burners will, however, be readily understood from the following description of the preferred practice of our method with reference to a tank in which the length is about twice the width and but two suitably spaced burners are employed for heating the fluid therein, and since the burners and associated mechanism may be substantially identical a description of one of them will suffice. Thus, in a tank T as shown in Fig. 1, we provide a submersible burner B, hereafter more fully described, which is desirably disposed in the longitudinal central plane of the tank about one-fourth the length of the tank from one end, and another burner (not shown) will then be similarly arranged in the tank a like distance from the opposite end; if a third burner is used it may preferably be positioned midway between the other two. The burner B is provided with any suitable fuel and air mixture through a vertically movable supporting pipe 10, the upper end of which is received in one branch of a T-fitting 12; a flexible conduit 13 leads from the latter to valve 14 interconnected with the outlet port of a mixing chamber 15. A valve controlled air supply pipe 17 and a similarly controlled gas supply pipe 18 are connected into the mixing chamber 15 so that by manipulation of the several valves a combustible mixture of fuel and air may be fed to the burner and the proportion of fuel to air as well as the quantity of the mixture delivered readily regulated in accordance with desired operating conditions.

The T-fitting 12 from which the burner is suspended also supports a slide rod 20 which extends upwardly therefrom. This rod may consist of a small pipe attached to the fitting through the medium of a sleeve 21, and the upper end of the pipe is closed by a cap 22 to prevent escape of fuel. The rod 20 is vertically slidable in a sleeve 23 supported by brackets 23' from horizontal bars 24 or any other convenient supporting means positioned above the tank and thereby permits vertical movement of the burner relatively to the tank when and as desired.

A counterweight 25 is preferably connected to a lug 26 on the T-fitting 12 through the medium of a flexible cord or chain 27 running over a sheave 28 to substantially counterbalance or slightly overbalance the burner, guide rod and parts rigidly connected thereto to facilitate raising the burner from the tank and lowering it thereinto, and to releasably hold it in lowered position we provide movable latches 30 carried by a cross bar 31 on top of the tank and adapted to engage the flange 32 of a collar 33 adjustably secured to the burner supply pipe 10 by means of a set screw 34.

The burner B which may desirably be formed principally of steel or any other suitable metal comprises a cylindrical tube 35 threaded to supply pipe 10 and serving as an inlet port and to support other portions of the burner therefrom. An outwardly flaring conical portion 36 is welded or otherwise permanently united to tube 35, and a larger cylindrical sleeve 37 forming the burner combustion chamber is similarly united with the outer edge of the conical portion 36. Within the chamber just below the junction of these parts are secured by soldering, brazing or the like, a pair of wire screens 38 slightly spaced apart and of sufficiently fine mesh to serve as flame guards and prevent propagation of flame in the conical portion 36 or supply pipe 10 when the combustible mixture fed to the burner through the latter is burned in the combustion chamber 37.

In the performance of the method of our invention with the aid of the apparatus just described, latches 30 are released and the burner is raised from the tank sufficiently for the lower end of its combustion chamber to clear the level L of the fluid in the tank and preferably to clear the floor level F. The several control valves are next operated to supply a mixture of fuel and air in suitable proportions and quantities and the burner is then lighted. Upon thereafter being lowered into the fluid, the pressure of the gas and air mixture in the burner is sufficient to overcome the opposing pressure of the fluid in the tank, so that as the burner is submerged the products of combustion escape from its lower end and rise through the fluid, causing violent agitation thereof.

By the provision of a combustion chamber of uniform diameter throughout and thus devoid of any restriction or narrowing at the point of egress from the burner of combustion products, we obtain highly efficient heating of the fluid and larger burner capacity than is the case in submerged burners having restricted outlets for the combustion products. Thus, a burner having a combustion chamber 6 inches in diameter has been operated at an hourly consumption of 900 cu. ft. of natural gas with which sufficient air was premixed to insure complete combustion, with consequent release of heat at the rate of approximately 900,000 B. t. u. per hour. It will be understood, however, the maximum limit of the capacity of a burner of this size may be considerably higher with efficient and economical release of heat at a more rapid rate, the results obtained during one period of normal operation having herein been cited for purposes of example only.

In our burner the total absence of restriction in the combustion chamber, particularly at its lower or outlet end, also causes the escaping combustion products to effect extremely active agitation of the fluid in which the burner is submerged and thus to minimize the deposition on the exterior surfaces of the burner of solidified anhydrous sodium sulphate during recovery of the latter.

As a general rule we prefer to construct the burner in such manner that the ratio of the length to the inner diameter of the combustion chamber is approximately 5:1, and when approximately this ratio is observed certain other advantages are realized which are not obtainable to a like extent in similar burners the corresponding dimensions of which depart materially from this ratio. Thus, as is well known, initial introduction of a lighted submersible burner into a fluid sets up violent agitation of the fluid and causes considerable bumping or churning therein, and in our burner this action is of but short duration, after which the action of the fluid changes to a fairly uniform but still vigorous ebullition due to the buoyancy of the products of combustion which are substantially uniformly and regularly discharged into it from the combustion chamber outlet of the burner and at a substantially uniform pressure.

The walls of the combustion chamber, which are composed entirely of steel or other suitable metal form a confining envelope for the gases within which substantially all combustion takes place and are thus maintained in close proximity to an area of intense heat extending from the outlet end of the chamber almost to the screens at the inlet end thereof and when this area is of considerable length, as in a burner having the dimension ratio just mentioned, complete combustion of the gas, even when introduced to the burner at high velocity and in large volume, may be readily obtained, without, however, material impairment of heat transfer to the fluid either through sudden rapid expansion of the gaseous combustion products or material delay in effecting their contact with the fluid after completion of combustion in or just below the end of the burner. In operating the burner submerged in a solution of sodium sulphate we have found a thin film of solid anhydrous sodium sulphate becomes deposited on the inner surfaces of the combustion chamber probably as a result of the splashing of the solution into the interior thereof during its initial introduction into the solution, and this film becoming incandescent is of material assistance in insuring complete combustion of the fuel, particularly at higher rates of consumption, while it may also afford some protection to the walls of the combustion chamber against deterioration by the action of the flame within it. Since the upper part of the combustion chamber and the screens therein are of course considerably removed from the vicinity of the outlet when the combustion chamber is proportioned approximately in accordance with the principles herein set forth, little or no deposition of anhydrous sodium sulphate on these parts occurs and interference with the free passage of the combustible mixture into the area in which combustion takes place is thereby avoided.

Some reference has been made to the pressure of the combustible mixture supplied to the burner and to its depth of submersion and it will be understood that these factors may be regulated in accordance with preference and may require some modification under various specific operating conditions. However, certain general principles may desirably be observed in relation thereto, for example, higher fuel and air pressures up to perhaps 20 lbs. gauge are usually to be preferred when relatively small burners are employed, since such pressures effectively minimize the deposition of scale on the exterior of the burner and maintain active agitation of the solution. With larger burners, however, these pressures may be reduced to points just sufficient to insure maintenance of continuous combustion in the burner and escape of its products therefrom at the depth of submergence desired, and with this qualification, changes in the latter depth within reasonable limits appear to have but relatively slight effect upon the operating efficiency of the burner, although we prefer to operate the 6-inch burner herein described with its outlet end submerged to a depth of approximately 3½ ft. below the level of the fluid in the tank.

In the operation of the burner in the manner herein mentioned, direct transfer of heat to the fluid is effected by contact of the products of combustion therewith and a high degree of efficiency thereby obtained with the result that contained water is rapidly evaporated and anhydrous sodium sulphate precipitated to the bottom of the tank for removal therefrom. Moreover, the continuous relatively violent agitation of the fluid causes the particles of anhydrous sodium sulphate to grow to appreciable size before their ultimate deposition at the bottom of the tank whereby handling and/or other operations into which they subsequently enter are facilitated, and by regulation of the degree of agitation by means of the burner controlling valves and by adjustment of the depth of submergence, the size of the particles may be subjected to limited control.

While the method embodying our invention has herein already received considerable mention, it may now be more fully described with particular reference to the apparatus shown in the drawing. Thus, at the initiation of the dehydration process, the tank T is supplied to the desired level with Glauber's salt, slurry or other material from which the dehydrated salt is to be extracted. The burner, maintained in elevated position and thus out of contact with the fluid, is then lighted and its control valves manipulated so as to supply the burner with desired quantities of a suitable mixture of fuel and air, and the lighted burner is then slowly lowered into the fluid. When it has reached the proper depth in the tank, corresponding to that for which flanged collar 33 has previously been set on supply pipe 10, the burner and its associated mechanism are locked in position by manipulation of the latches and thereafter continue to operate for any desired period. The screw conveyor in the bottom of the tank may be set in motion upon subsequent initiation of the deposition of the anhydrous salt from the fluid to carry the salt to a convenient point for removal from the tank and upon its removal and drying in the usual way it is ready for use.

In the course of the operation of the burner the products of combustion and water vapor are given off in considerable quantities and may be removed from the vicinity of the apparatus by means of a suitable shield and conduit or any other convenient ventilating apparatus (not shown). The reduction of the water content of the fluid in the tank together with the extraction and removal of the anhydrous sodium sulphate therefrom usually carrying with it small quantities of the solution, causes substantially continuous material depletion of the total volume of fluid in the tank, and to maintain this volume substantially constant for continuous operation the solution carried with the removed salt may be recovered therefrom as by centrifuging and returned to the tank, and either fresh sodium sulphate solution or crystalline hydrous Glauber's salt or a mixture thereof may be supplied continuously or intermittently, as desired, as the elevated temperature of the fluid body in the tank rapidly melts the solid particles of the hydrous salt by effecting their solution in their water of crystallization and by precipitation of a portion of the sodium sulphate content. Substantially continuous extraction of anhydrous sodium sulphate may thus be maintained for relatively long periods without the usual caking and/or clogging occurring from time to time in apparatus heretofore constructed and operated in accordance with known methods, and interruption of the operation of our apparatus for such causes is therefore substantially unnecessary. Moreover, the walls of our fluid tank are heated only indirectly by contact of the heated solution therewith and are not, as in apparatus heretofore known, heated to a temperature greater than that of the solution and this, together with the violent agitation of the solution which may readily be maintained in the tank when our burners are employed and operated as herein described, prevents adherence of precipitated solids to the tank walls, burners and associated parts, with consequent avoidance of caking or clogging of these mechanisms.

While we have herein described our novel method with considerable particularity and especially with reference to apparatus which we find convenient for its performance in the commercial recovery of anhydrous sodium sulphate, it will be understood that the method is not limited or confined to the employment of either the apparatus specifically shown and described or modifications thereof, and that while the said apparatus is eminently suitable for performing the said method, it may be used for other purposes and in practicing other methods, moreover numerous changes and modifications in the form, construction and arrangement of the several parts of the apparatus and in their mode of operation as well as in the several steps embodied in the method will readily occur to those skilled in the art, and may be made if desired without departing from the spirit and scope of the invention as defined in the appended claims.

Having thus described our invention, we claim and desire to protect by Letters Patent of the United States:

1. A commercially useful method of dehydrating hydrous Glauber's salt which comprises the steps of confining a body of fluid containing the salt, introducing below the surface of the fluid burning gases directed downwardly therein, confining the said burning gases in a continuous metallic envelope of constant internal cross sectional area and of such dimensions that substantially complete combustion occurs therein and heat exchange is effected directly from said burning gases through the metal to the fluid, and permitting the products of combustion to discharge freely therethrough into the fluid at the lower open end of said envelope, while maintaining a continuous flow of intermixed fuel and air into the upper end of the envelope to maintain a substantially uniform flow of combustion products into the fluid.

2. The method of obtaining a commercially useful precipitation recovery of anhydrous sodium sulphate from Glauber's salt which comprises the steps of maintaining within a confined area a body of fluid of substantial depth consisting of Glauber's salt solution and crystalline Glauber's salt, introducing into said fluid below its surface a downwardly directed stream of burning gases while confining said stream within a continuous cylindrical envelope consisting of metal of substantially constant cross-sectional area and unrestricted at its lower end adapted to conduct through its wall to the surrounding fluid a portion of the heat of said gases, effecting substantially complete combustion of the gases in the envelope and discharging the products of combustion freely through the lower end thereof into the fluid while maintaining a continuous flow of inherently combustible gaseous mixture into the upper end of the envelope to thereby maintain a substantially uniform flow of combustion products into the fluid to induce its agitation.

3. The method of obtaining a commercially useful precipitation recovery of anhydrous sodium sulphate from Glauber's salt which comprises the steps of maintaining within a confined area a body of fluid of substantial depth consisting of Glauber's salt solution and crystalline Glauber's salt, introducing into said fluid below its surface a downwardly directed stream of burning gases while confining said stream within a continuous cylindrical envelope consisting of metal of substantially constant cross-sectional area and unrestricted at its lower end adapted to conduct through its wall to the surrounding fluid a portion of the heat of said gases, effecting substantially complete combustion of the gases in the envelope, discharging the products of combustion freely through the lower end thereof into the fluid while maintaining a continuous flow of inherently combustible gaseous mixture into the upper end of the envelope to thereby maintain a substantially uniform flow of combustion products into the fluid to induce its agitation, withdrawing the precipitated anhydrous sodium sulphate and concurrently, while continuing the flow of the gases, adding Glauber's salt to the fluid to maintain it at a substantially constant volume and concentration.

HENRY W. DOENNECKE.
EMORY W. DOUGLASS.
CARL O. ANDERSON.